United States Patent [19]
Ushikubo

[11] Patent Number: 4,767,917
[45] Date of Patent: Aug. 30, 1988

[54] AUTOMATIC VENDING MACHINE

[75] Inventor: Kohei Ushikubo, Isesaki, Japan

[73] Assignee: Sanden Corporation, Gunma, Japan

[21] Appl. No.: 842,999

[22] Filed: Mar. 24, 1986

[30] Foreign Application Priority Data

Mar. 22, 1985 [JP] Japan .................................. 60-56098

[51] Int. Cl.⁴ ............................................... G06F 7/08
[52] U.S. Cl. .................................... 235/381; 235/380;
340/825.35
[58] Field of Search ....................... 235/379, 380, 381;
340/825.35

[56]  References Cited

U.S. PATENT DOCUMENTS

| | | | |
|---|---|---|---|
| 4,442,345 | 4/1984 | Mollier et al. | 235/380 |
| 4,518,852 | 5/1985 | Stockburger et al. | 235/381 |
| 4,532,418 | 7/1985 | Meese et al. | 235/381 |
| 4,553,211 | 11/1985 | Kawasaki et al. | 235/381 X |
| 4,656,342 | 4/1987 | Ugon | 235/379 |

Primary Examiner—David L. Trafton
Attorney, Agent, or Firm—Banner, Birch, McKie & Beckett

[57] ABSTRACT

An automatic vending machine is arranged so as to dispense a sale only when card identifying information which has been registered and card identifying information which is input are collated and the result of collation verifies a valid registration. The machine has means for inputting card identifying information, a registered card memory unit for storing card identifying information input from the inputting means, and a control circuit having the function of registering in the registered card memory unit card identifying information which is input from the inputting means.

7 Claims, 1 Drawing Sheet

AUTOMATIC VENDING MACHINE

BACKGROUND OF THE INVENTION

The present invention is directed to an automatic vending machine and, more particularly, to an automatic vending machine in which goods or the like are dispensed in response to a key card.

In an automatic vending machine, it is common for cash (coins or bills) to be used for inducing a sale. More recently, automatic vending machines which are operated exclusively by key cards have been put to practical use. In these machines, a magnetic card or other type of key card is employed for inducing a sale. In some types of such machines, even a payment can be made using such a card.

Cards used in the above-described card-operated automatic vending machines include cards conforming to industrial standards which are regulated by JIS or ISO and the like (hereinafter referred to as "standardized cards") and cards conforming to specifications so as to be suitable for use in particular automatic vending machines (hereinafter referred to as "special cards").

Methods of payment for purchases from automatic vending machines using a card system fall into two types, i.e., payment in advance and credit type payment. In accordance with the payment in advance method, a user purchases a card in advance for cash, which card stores data by means of a magnetizable configuration, corresponding to a given purchase price. Every time the card is used in the machine, the recorded information is appropriately changed so as to indicate the remaining credit amount. In accordance with the credit type payment method, a card holder utilizes a vending machine for a purchase using a card which has been issued to him. The amount of each purchase is stored in the machine, and the amounts debited against each card are accumulated over a predetermined period of time and are then billed to each card user at the end of that period.

In a card-operated automatic vending machine, it is essential to safeguard against potentially dishonest purchasers who attempt to use counterfeit cards, stolen cards or the like (measures taken against such acts are hereinafter referred to as "security measures"). In the above-described prepaying method, since purchases are paid for in advance and in cash, there is no possibility of the charges not being collected. However, the data corresponding to the amount written on a card may be altered and the altered card then used in the machine. One of the security measures which can be taken against this type of dishonest act is to mark a card by, for example, punching the same with a pattern corresponding to the purchased amount. It is for this reason that the prepaying method generally employs a special card.

Although the prepaying method is advantageous from the viewpoint of security measures, the special cards used in this method are typically abandoned when the amount of credit shown on the card is expended, disadvantageously making the costs of card provision higher.

Moreover, in the conventional automatic vending machine in which a prepaid card is employed for purchase, a card is either sold over the counter or in an automatic vending machine provided for dispensing such cards. If it is desired to use a card issued in accordance with either one of the above methods in automatic vending machines throughout the country, which machines may be exclusively operated by cards of a particular type or have common ownership, additional expense is incurred in controlling the stock of cards as well as in installing the card issuing machines.

On the other hand, in the deferred paying method, since the standardized cards issued are used over a long period, durable material such as plastic may be employed. As for the security measures necessary for this method, a list of defective cards may be stored in the vending machine for checking against each card when used. Generally, however, the quantity of defective cards is enormous, and the vending machine therefore requires an expensive memory unit having a large capacity. Further, the list of defective cards has to be frequently updated, and, therefore, the list already held in each machine must likewise be updated.

Alternatively, to provide security measures in the method of payment on credit, an on-line authorization terminal may be used to check cards to ensure that they are valid. This terminal is necessarily provided in each vending machine and is connected to an on-credit checking system through existing telephone lines. This security measure, however, incurs expenses in the form of rents for the authorization terminal equipment, fees for the on-credit checking system and charges for the telephone lines employed. These charges are of course added to the cost of maintaining a vending machine and ultimately passed on to the consumer.

An additional security measure which can be used in the above described key card vending machine is a device which takes physical control of a card after determining that it is invalid. In key card vending machines wherein a card custody device is employed, additional expense is incurred in maintaining the card custody device as well as returning cards to their owners or issuers. These expenses are also added to the cost of maintaining a vending machine.

Thus, conventional key card operated automatic vending machines are subejct to a number of limitations because of their cost and the necessity for security measures.

SUMMARY OF THE INVENTION

Accordingly, an object of the present invention is to provide an automatic vending machine in which cards are used for effecting purchases and in which it is possible to implement satisfactory security measures at a low cost.

To this end, there is provided an automatic vending machine wherein a sale is effected only when card identifying information which has been registered in advance is collated with card identifying information which is provided at the time of sale and the result of the collation verifies a valid registration. An automatic vending machine in accordance with the present invention includes means for inputting the information identifying a card, a registered card memory unit for storing the card identifying information provided by the inputting means and a control circuit having the dual function of storing the card identifying information and collating stored information with information provided prior to a sale.

PREFERRED EMBODIMENTS OF THE INVENTION

Figure 1:
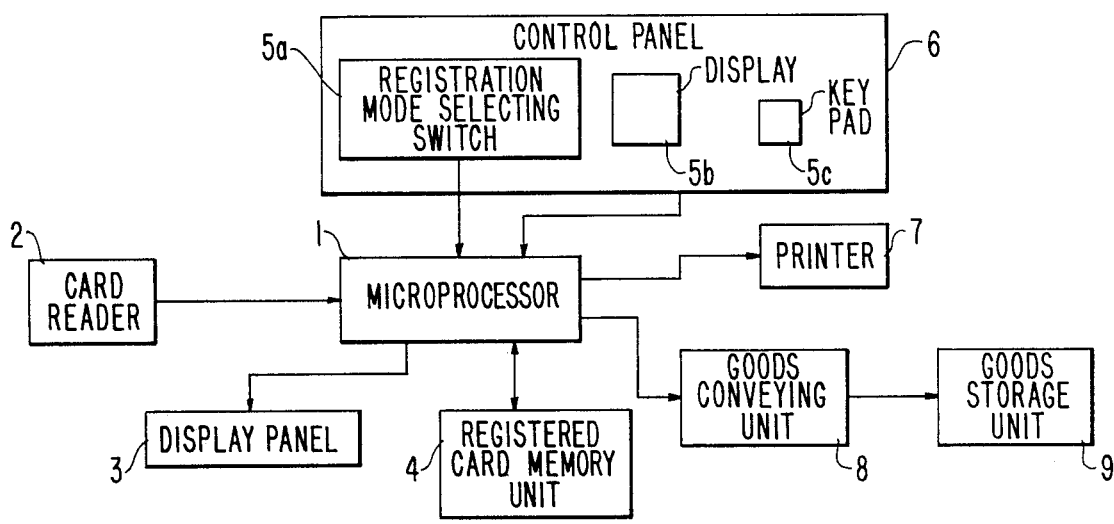
FIG. 1 is a block diagram of one embodiment of an automatic vending machine according to the present invention.

FIG. 1 shows the relationship between the various elements housed in an automatic vending machine constructed in accordance with the present invention. Microprocessor 1, having functions which will be described later, is connected to card reader 2 for receiving therefrom card identification information. Card reader 2 may comprise any device of conventional construction which is capable of reading card identifying information from a card wherein the information is recorded on magnetic stripes of a certain standard (cards which employ the same standaard for their magnetic stripes are referred to hereinafter as "compatible cards"). In the preferred embodiment, card reader 2 is of the type wherein the user maintains possession of the card during reading. However, it will be appreciated by those skilled in the art that many other arrangements for card reader 2 may be employed in a vending machine constructed in accordance with the present invention.

Microprocessor 1 is also coupled to user display panel 3 for communicating with a user of the vending machine. User, or consumer, is used herein to refer to a purchaser of goods from the vending machine as distinguished from an owner or proprietor of the vending machine (the latter being referred to herein as an operator). Display panel 3 may comprise a conventional alphanumeric display, for providing the consumer with transaction information, e.g., operation sequence information, key card validity confirmation, confirmation of selected goods, total cost of selected goods, etc. Additionally, display panel 3 may include a conventional key pad for receiving transactional data from the consumer, which data will be supplied to microprocessor 1.

Microprocessor 1 is also coupled to registered card memory unit 4. Registered card memory unit 4 is provided for storing key card identification information corresponding to key cards which have been registered by an operator of the vending machine. Registered card memory unit 4 is in data communication with microprocessor 1 for receiving card identification information to be stored. Additionally, registered card memory unit 4 cooperates with microprocessor 1 to authorize transactions by determining whether key card information entered prior to a sale identifies a registered card, i.e., that the information has been previously stored in card memory unit 4. The cooperation of registered card memory unit 4 with microprocessor 1 will be described more fully hereinbelow.

In the preferred embodiment, registered card memory unit 4 may comprise any conventional static random access memory (RAM) which is compatible with microprocessor 1. It will be apparent to those skilled in the art that registered card memory unit 4 may comprise any known memory device which is compatible with microprocessor 1 and is capable of storing and retrieving information. It will be also apparent to those skilled in the art that the amount of memory necessary is dependent both on the number of cards to be registered and the amount of memory which is necessary for registration of one card.

The microprocessor 1 is further connected to a goods conveying unit 8 which is coupled to a goods storage unit 9. Goods conveying unit 8 is responsive to an authorization signal received from microprocessor 1 for retrieving selected goods from goods storage unit 9 and conveying the selected goods to the consumer. Both goods conveying unit 8 and goods storage unit 9 may comprise known components of conventional automatic vending machines.

Microprocessor 1 is also coupled to a printer 7. Printer 7 is provided for printing transactional information to be provided to the consumer following a sale, thereby providing the consumer with a receipt. Further, printer 7 may be employed for printing transactional data to be provided to the operator and used for billing consumers. Printer 7 may comprise any device of conventional design which is compatible with microprocessor 1. As an example, printer 7 may comprise an Epson M-180 series small printer.

Control panel 6 and registration mode selecting switch 5a are coupled to microprocessor 1. Registration mode selection switch 5a is mounted to control panel 6 which is in turn mounted to the vending machine in such a manner that it is not accessible to a consumer and may only be accessed by an operator. Control panel 6 may comprise, in addition to registration mode selection switch 5a, an alphanumeric display 5b and a key pad 5c as well as several function switches, e.g., delete switch, enter switch, etc. These components are provided for use by the operator while registering a key card as will be described below. Registration mode selection switch 5a is provided for selecting the mode of operation of the vending machine. All of the devices which comprise control panel 6 may be of standard design. However, registration selection switch 5a is preferably provided in the form of a keyswitch for the convenience of administering card registration.

Lastly, microprocessor 1 may be coupled to a plurality of peripheral devices necessary for operating the microprocessor. Such devices include, but is by no means limited to, program memory, oscillators, latches, buffers and interfaces. The use of microprocessor 1 in conjunction with these devices is well known in the art. Accordingly, the type and design of the necessary peripheral devices can be readily provided after selection of microprocessor 1. Microprocessor 1 may comprise any suitable data processing device such as a Z80 microprocessor which is available from Zilog Incorporated.

In an automatic vending machine of the type described above, a compatible card is first registered, before being used in any sale, by setting microprocessor 1 to the registration mode using registration mode selecting switch 5a. The data written on the compatible card (representing, for example, the number of the card, name of a bank, etc.) is then read by card reader 2. This information is provided to microprocessor 1 which stores the card identifying information in registered card memory unit 4. At this time, if it is desired to display the information read from the card reader or confirm the registration, and if such instructions are provided via control panel 6, microprocessor 1 will display the card identification information or the confirmation of the registration on user display panel 3 and/or control panel 6. If necessary, the details of the registration may be printed out by printer 7.

In the above-described registration operation, all cards may be registered which have magnetic stripes identical in standard to that of the cards readable by card reader 2. For example, cards which have already been issued by credit card companies, banks and the like, and possessed by the consumer for purposes other than purchases from the vending machine, can be registered as long as they have magnetic configurations of a standard which is compatible to the magnetic stripe standard which can be read by card reader 2.

After the card registration is completed, the registration mode selecting switch 5a is reset so as to set the microprocessor 1 to a sale mode. When a consumer inserts his compatible card into card reader 2 of the automatic vending machine, the information identifying the card is read and microprocessor 1 searches the registered card memory unit 4 to determine whether it contains data identical to that of the card just read by card reader 2. If it is determined that the card has not been registered, or that the stored card identifying information has been supplemented with data indicating invalidity of the card, microprocessor 1 will inform the consumer that a sale cannot be effected with that card via user display panel 3. On the other hand, if the registration of the card is confirmed, microprocessor 1 will control user display panel 3 to inform the consumer that the vending machine is ready to dispense a sale.

When the panel displays information that the card registration has been confirmed, the consumer selects desired goods using the key pad of user display panel 3. Goods conveying unit 8 will be driven in response to an authorization signal received from microprocessor 1, and the desired goods which have been selected will be discharged from goods storing unit 9. After delivery of the goods microprocessor 1 prints out by means of printer 7 a list of the goods which have been sold, that list also being kept within the automatic vending machine. At the same time, the card identifying information which has been stored in registered card memory unit 4, and which corresponds to the card of the purchasing consumer, is supplemented with data representing the amount purchased. Further, this amount is supplemented every time the consumer utilizes the vending machine.

The thus prepared list of goods sold (sales record) and the amounts debited against each card may be printed by the printer 7, in response to instructions received via control panel 6, and thereafter used for charging the account of the card holder. The form of charging may be coordinated with the method of credit card companies or, alternatively, the total amount or purchases made against each card may be directly charged to a card holder by the automatic vending machine owner. This latter method of charging may be particularly advantageous when the vending machines are operated in a restricted area and are thus accessible to only a limited number of consumers.

As will be understood from the foregoing description, the registration of a key card in this type of automatic vending machine is carried out while a key card holder and the operator is present. Additionally, when registered cards are stolen, lost, or otherwise removed from the possession of the owner, the card holder may report this fact to the operator such that the information identifying the dipossessed card can be deleted from registered card memory unit 4 or, alternatively, supplemented with additional data representing the invalidity of the card.

In a further embodiment, the use of invalid cards may be prevented by employing a system wherein a secret number (sometimes referred to as a PIN or personal identification number) is assigned to a card upon registration, which number is provided to the consumer and is stored in registered card memory unit 4 with the card identification information. The secret number must be provided to the machine by the consumer via the key pad of user display panel 3, along with the information which is read from the consumer's key card, prior to a sale. Before a sale is authorized, the user provided secret number is collated with that recorded in the vending machine. This method eliminates the need for the operator to invalidate the registration of key cards which have inadvertently fallen out of the possession of the consumer.

In automatic vending machines built in accordance with the present invention, even if a key card is stolen it is impossible for the person who has stolen that card to know which automatic vending machines can be operated by that card, i.e., with which machines the card has been registered. Hence, the thief is prevented from using the card for illegal purposes. On the other hand, attempts may be made to counterfeit a key card. However, the card identifying information which is registered in the machine (e.g., the number of a card) is limited, and it is therefore difficult to discover it by guess-work. Thus, the automatic vending machine according to the invention enables adequate security measures to be taken.

In the above described automatic vending machines, since the consumers operating each machine are generally limited to those who are involved in some way with the location where the machine is installed, the capacity of the registered card memory unit 4 need not be large. Additionally, it may be arranged that, when a particular card has not been used for the purchase of more than a predetermined amount of goods over a predetermined period (for example, half a year), the corresponding card identifying information is deleted so as to ensure effective use of the registered card memory unit 4. As described above, the consumers operating each automatic vending machine of this type are limited to those present in a certain location, and this condition applies to the case of an automatic vending machine being installed only within a certain business establishment, thereby making the present invention particularly applicable to automatic vending machines which are installed in places of business.

Thus, in the automatic vending machine according to the invention, it is possible to employ cards which the consumers already possess for other purposes. Hence, it is not necessary to issue a new card solely for use in this machine. It is also possible to take adequate security measures at a low cost, while the capacity of the registered card memory unit 4 can be at the same time made small.

The above-described embodiment is arranged such that the elements shown in blocks in FIG. 1 are all contained within the automatic vending machine proper. In a known automatic vending machine, however, the controlling unit, the coin receiving unit, and the goods storing unit may be separate from one another. To meet the demand for such a machine construction, the arrangement of the above embodiment can be altered without any reduction in the utility of functions by physically separating the elements shown in FIG. 1, by changing the number of the elements to be included in the machine, or any combination thereof.

Figure 2:
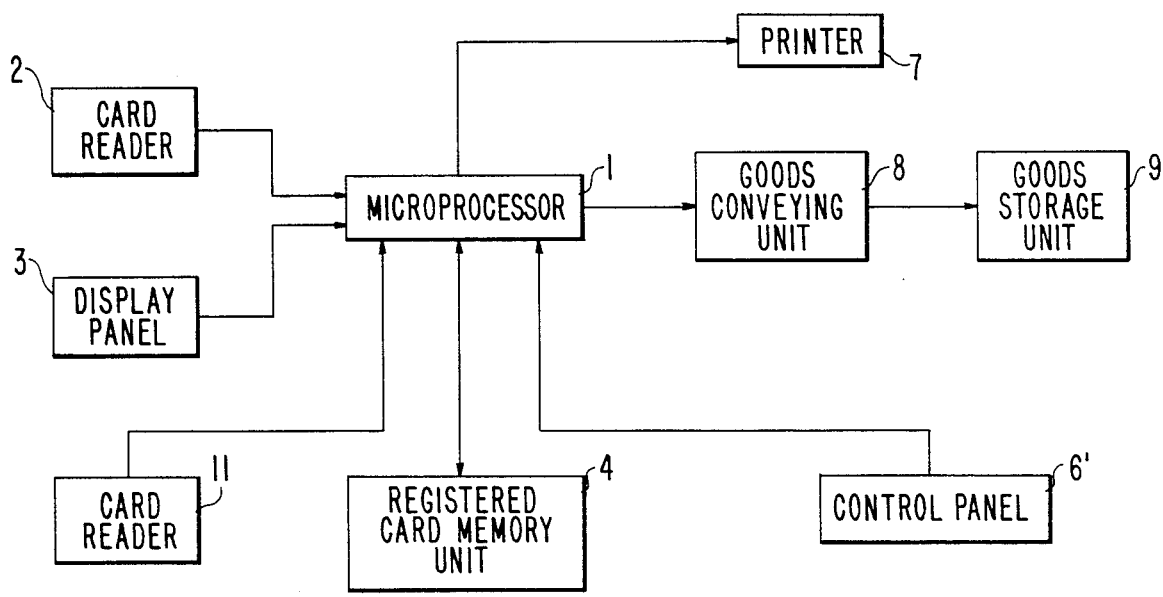
FIG. 2 is a block diagram of another embodiment of an automatic vending machine according to the invention.

Referring to FIG. 2, the automatic vending according to the invention may be, for example, installed at a store or other business establishment in such a manner that card reader 11 (which is provided for registering cards only) registered card memory unit 4, and control panel 6' are installed indoors, while microprocessor 1, card reader 2 (which is provided for use by consumers), user display panel 3, printer 7, goods conveying unit 8 and goods storing unit 9 are placed outdoors. The broken line 10 shown in FIG. 2 designates the division between indoors and outdoors.

With the thus modified arrangement of the automatic vending machine according to the invention, card registration can be carried out within a shop using card reader 11, thereby allowing customer control, sales control and the like to be carried out easily. What is required of a consumer of this machine is to insert his card into card reader 2 when purchasing goods.

In the above-described embodiments of the machine, registration is accomplished by employing a card reader. It will be apparent to those skilled in the art, however, that the card identifying information, including the card number and the like, may alternatively be provided to the machine by operating the control panel. Further, card readers presently available include those which are capable of reading card identifying information against a plurality of magnetic stripe standards. With such a card reader included in the machine, the number of types of compatible cards which can be used in the machine may be further increased.

As will be understood from the foregoing description, the automatic vending machine according to the invention allows the number of types of cards which may be used in a machine to be increased, while maintaining security measures at a low cost.

Obviously many modifications and variations of the above described preferred embodiments will become apparent to those skilled in the art after reading this disclosure. It should be realized that the scope of the present invention is not limited to the particular embodiments described herein but is intended to be limited only by the scope of the appended claims.

What is claimed is:

1. A method of operating a vending machine comprising the steps of:
   operating the vending machine in a registration mode such that a plurality of user's key cards may be registered therewith;
   reading unique key card identification information from the user's key card to be registered while the machine is operating in the registration mode;
   registering the user's key card with the machine by storing the unique key card identification information read therefrom in a registered card memory unit of the vending machine;
   operating the vending machine in a sale mode such that goods may be dispensed;
   entering the unique card identification information which identifies a particular key card while the machine is operating in the sale mode;
   determining whether the particular key card has been registered by determining whether the entered information has been previously stored in the registered card memory unit of the vending machine during a registration mode; and
   authorizing a sale such that goods may be provided if the particular key card has been registered with the machine.

2. The method as recited in claim 1 further comprising the steps of:
   storing the total dollar amount of each sale to a particular key card along with the card identification information which corresponds to that particular key card in the registered card memory unit of the vending machine;
   revising the stored dollar amount corresponding to a particular key card upon each sale to that key card to reflect the total accumulated dollar amount of sales to that particular key card within a predetermined period of time; and
   periodically determining the accumulated dollar amount of sales to each key card registered with the vending machine such that the owner of each registered key card may be billed accordingly, wherein the billing period corresponds to the period over which sales purchases are accumulated in the machine.

3. The method as recited in claim 1 further comprising the steps of:
   operating the vending machine in the registration mode such that a registered key card may be invalidated; and
   invalidating a registered key card by removing the key card identification information which corresponds to the key card to be invalidated from the registered card memory unit of the vending machine such that sales to the invalidated key card will no longer be authorized.

4. A vending machine for dispensing goods, said machine comprising:
   user interface means for obtaining the user's key card identification information unique to a particular key card;
   registered card memory means for storing the unique key card identification information of a plurality of particular key cards;
   operator interface means for providing first and second mode control signals;
   data processing means responsive to the first and second mode control signal for storing the unique key card identification information obtained by said user interface means in said card memory means and responsive to the second mode control signal for determining whether the unique key card identification information obtained by said user interface means has been previously stored in said memory means and, if so, providing an authorization signal; and
   dispensing means responsive to the authorization signal for dispensing goods.

5. The vending machine as recited in claim 4 wherein said operator interface means is not accessible to a user of the vending machine and, therefore, can only be accessed by an operator of the vending machine.

6. The method as recited in claim 2 further comprising the steps of:
   storing the date of each sale to a particular key card with the total dollar amount and;
   deleting the card identification information from the registered card memory if there have been no sales over a predetermined period of time to the particular key card.

7. The method as recited in claim 2 further comprising the steps of:
   storing the date of each sale to a particular key card with the total dollar amount and;
   deleting the card identification information from the registered card memory if sales have not exceeded a predetermined amount over a predetermined period of time to the particular key card.

* * * * *